United States Patent [19]

Ivanov et al.

[11] 4,035,545
[45] July 12, 1977

[54] HEAT-RESISTANT POROUS STRUCTURAL MATERIAL

[76] Inventors: Albert Bonevich Ivanov, ulitsa Miklukho-Maklaya, 43, kv. 17; Jury Leonidovich Krasulin, ulitsa Angarskaya, 65, kv. 123; Lev Kimovich Gordienko, Kutuzovsky prospekt, 18, kv. 48, all of Moscow, U.S.S.R.

[21] Appl. No.: 697,730

[22] Filed: June 21, 1976

[51] Int. Cl.² .................... B32B 5/16; B32B 15/00
[52] U.S. Cl. ................................ 428/328; 428/309
[58] Field of Search .......... 428/306, 309, 328, 329, 428/330, 357, 402, 539

[56] References Cited

U.S. PATENT DOCUMENTS 3,719,519   3/1973   Pergugini ........................ 428/328
3,856,709   12/1974   Porta et al. ..................... 428/329

*Primary Examiner*—William J. Van Balen

[57] ABSTRACT

A material, comprising 50–75 volume percent of microspheres of high-melting point oxides, sintered directly with each. The diameter of said microspheres ranges from 10 to 200 mu. The diameter of contact of said sintered microspheres amounts to 0.2–0.5 of said microsphere diameter.

The present invention enabled an enhancement of recrystallization resistance, strength and deformability of said heat-resistant porous structural material. Thus, a material made of microspheres of stabilized zirconium oxide, 30–40 mu in diameter, with a contact diameter equal to 0.3 of the microsphere diameter and a 30% porosity exhibits a compression strength of 6000 kg/cm², a tensile strength of 500 kg/cm² and 0.01 elongation at room temperature, which constitutes a 5–10-fold increase, as compared with the corresponding characteristics of the known granular materials of a similar composition.

5 Claims, No Drawings

HEAT-RESISTANT POROUS STRUCTURAL MATERIAL

The present invention relates to heat-resistant structural granular materials based on high-melting point oxides.

The present invention is of particular advantage in high-temperature engineering, preferably, for thermally stressed elements of power and process apparatus operating in an oxidizing atmosphere within $10^3$–$10^4$ hours with the temperature on the surface of said elements attaining up to 2000° C. Moreover, the proposed materials are adaptable for short-term use at a temperature on the surface of said elements in excess of 2000° C and the density of heat flux acting on said elements equal to about $10^7 Cal/m^2 \cdot hr$.

At present known in the art are heat-resistant porous granular materials of high-melting point oxides with a melting point of more than 1700° C, such as silicon, aluminum, zirconium and yttrium oxides, said materials being used mainly in lining elements. The above materials constitute a sintered mixture of fine, medium-size and relatively coarse particles of an arbitrary shape. Usually the coarse particles are referred to as a filler and fine-disperse ones as a binder. In manufacturing such materials the amounts of the filler and binder employed are, as a rule, equal accordingly to about 70 and 30 weight percent. The porosity of said materials varies from 15 to 20%.

In granular polyfractional materials the grains (particles) differ in size by 3–4 orders of magnitude. Usually the maximum size is 2–3 mm, while the minimum one amounts to several microns. The most important distinguishing feature of said polydisperse granular materials is their considerable macroheterogeneity resulting from nonuniform sintering conditions of individual grains and their conglomerates in various sections of the system. Thus, the material may, for example, comprise macrovolumes composed of a predominant amount of sintered grains from fine fractions. The grains of coarser fractions may come in direct contact with each other, with the value and geometry of said contact differing considerably. Structure-sensitive properties of polydisperse granular materials of high-melting point oxides and, above all, their strength, deformability and recrystallization resistance are determined in the first place by the amount, area and contact geometry of their grains.

However, the application of said heat-resistant materials as structural ones is limited or on some occasions unfeasible for a variety of reasons:

1. The known granular materials exhibit low strength and deformability which are specified by the above-outlined specific features of the contacts between their grains;

2. During long-term operation in a temperature range above 0.5–0.6 of their melting points the structure of the known granular materials features insufficient stability and their recrystallization resistance is too low, this resulting from both the presence of a binder in their structure and by the above-specified peculiarities of the contacts between their grains.

Thus, granular materials with a moderate apparent porosity of 15–20%, based on pure zirconium, yttrium, aluminum and magnesium oxides, show a compression strength of 200–1000 kg/cm², a tensile strength of 20–100 kg/cm² and up to 0.002 elongation (at a temperature of 20° C). However, said values happen to be inadequate taking into account thermal stresses arising in structural members made of said materials under the effect of considerable heat fluxes to which they are exposed in service. Recrystallization of said polydisperse granular materials may result in considerable local modifications and redistribution of geometry, volume and size of both the pores and grains which take place in certain volumetric macrosections with a higher concentration of fine fractions. Under operating conditions it causes at first a small and then a steadfast reduction in strength. Thus, after isothermal holding for 100 hours at a temperature of 1750° C the compression strength of a polydisperse material of stabilized zirconium dioxide diminishes from 500 kg/cm² to 300 kg/cm², as compared with its initial value.

Known also in the art are granular materials, comprising microspheres (mainly, the hollow ones), said materials being manufactured, e.g., by the plasma technique or by spraying molten pumice, glass and alumina. In said materials the microspheres employed as a filler are bonded by means of various binders: an epoxy resin, cement or fine-disperse oxide powders. In this case the operating temperature, strength, deformability and some other properties of said materials are determined by appropriate binder characteristics and by the structure of these materials.

Thus, a material, comprising glass hollow microspheres bonded with an epoxy resin, exhibits a compression strength of 560–1400 kg/cm². However, said material cannot be regarded as a heat-resistant one and actually it finds application in furniture and construction industry and in manufacturing floating means. Known in the art are materials, comprising hollow microspheres of aluminum oxide employed as a filler, said materials being used for heat-insulating purposes at a temperature of 1800° C. However, their compression strength varies within 35–170 kg/cm², i.e., it is lower than corresponding characteristics of conventional heat-resistant porous granular materials.

It is an object of the present invention is to provide a heat-resistant porous structural material which would feature a higher strength.

Another object of the invention is the provision of such a heat-resistant porous structural material which would possess a higher deformability.

Still another object of the present invention is to provide a heat-resistant porous structural material which would exhibit a higher recrystallization resistance as compared with the prior-art materials.

Said and other objects are achieved in a heat-resistant porous structural material, comprising microspheres of high-melting point oxides, said material, according to the present invention, containing 50–70 volume percent of said microspheres, 10–200 mu in diameter, which are sintered directly with each other so that their contact diameter amounts to 0.2–0.5 of the microsphere diameter.

In this case the above materials were manufactured from microspheres of stabilized zirconium dioxide, 30–40 mu in diameter with the contact diameter amounting to 0.3 of the microsphere diameter, said materials featuring a 30% porosity, a compression strength of 6000 kg/cm², a tensile strength of 500 kg/cm² and elongation of 0.01 at room temperature, which constitutes a 5–10-fold increase as compared with the corresponding characteristics of prior-art granular materials of a similar composition.

Materials, comprising aluminum oxide microspheres, 30–40 mu in diameter, with the contact diameter between said microspheres of 12–15 mu and a 35% porosity exhibit a compression strength of 9000 kg/cm², a tensile strength of 950 kg/cm², their relative deformation being 0.007, these values also exceeding by 7–10 times the corresponding characteristics of the known porous materials. The recrystallization velocity of the proposed materials that is expressed by the alteration of grain (microsphere) geometry and size is substantially lower than that of the prior-art materials. Thus, a material, comprising sintered aluminum oxide microspheres, 60–70 mu in diameter did not display secondary recrystallization upon isothermal holding for 50 hours at a temperature of 1860° C. According to the invention, heat-resistant materials, comprising microspheres within the above size and contact range, featuring a higher strength, deformability and recrystallization resistance, as compared with prior-art materials, rank in the first place among the structural materials.

It is expedient, according to the invention, that the material composition incorporate additionally 25–50 volume percent of a filler.

Owing to the present invention, providing a strong porous material, comprising directly sintered microspheres, it is possible to obtain various kinds of special-purpose materials of diversified application, such as, high-strength heat-resistant electrical engineering, heat-insulating and thermostable materials ensuring stable operation of various structures without any changes in the geometry of their elements.

For producing high-strength heat-resistant electrical engineering materials it is sound practice that metals, metallic alloys or intermetallic compounds be used as a filler.

For manufacturing high-strength heat-resistant ablation materials it is expedient that an organic compound — a phenolformaldehyde resin or polyvinyl alcohol or an epoxy resin or, finally an organosilicone polymer be used as a filler.

To produce heat-resistant high-strength structural thermostable materials it is good practice that, according to the present invention, glass be employed as a filler.

Thus, a heat-resistant structural material, comprising microspheres of zirconium dioxide stabilized by 6 weight percent of calcium oxide, 92–100 mu in diameter, with the contact diameter between the sintered microspheres of 30–40 mu and a 35% porosity shows a compression strength of 800 kg/cm². A structural electrical engineering material of a similar composition and structure, incorporating additionally 30 volume percent of bismuth, features a compression strength of 2100 kg/cm² and is capable of conducting an electric current having a density of up to 100 A/cm² at a voltage of up to 50 V when operating under arc discharge conditions.

A structural ablation material, comprising 60 volume percent of microspheres of zirconium dioxide stablized by 15 w weight percent of yttrium oxide, 150 mu in diameter, with the contact diameter between the sintered microspheres of 40–45 mu, whose composition incorporates additionally 35 volume percent of an organo-silicon polymer as a filler can operate without any changes in its geometry in contact with combustion product flow owing to evaporation of said polymer.

A structural heat-resistant thermostable material, comprising 56 volume percent of microspheres of zirconium dioxide stablized by calcium oxide, 92–100 mu in diameter with the contact diameter between said microspheres of 34–38 mu, whose composition incorporates additionally 25–30 volume percent of glass with a thermal expansion coefficient of $1-3 \cdot 10^{-6}$ deg$^{-1}$, shaped as a plate 17 mm thick is capable of withstanding one-sided heating at a rate of up to 2–2.5 deg/s without cracking, this exceeding by 5–6 times the permissible heating rate of the plate similar in size but produced in prior-art granular material of a similar composition and a 18% porosity.

Other objects and advantages of the present invention will become apparent from the following detailed description of the heat-resistant porous structural material and of its exemplary embodiments.

The heat-resistant porous structural material of the invention can comprise compact, porous or hollow microspheres with a monocrystalline, polycrystalline or amorphous structure produced of high-melting point oxides with a melting point of at least 1700° C, such as, stabilized zirconium dioxide, yttrium, aluminum, magnesium, hafnium, thorium, beryllium or silicon oxides. According to the present invention, provision is made for producing said microspheres by resorting to known methods, e.g., by the plasma processing of the powdered high-melting point oxides in a high-frequency discharge or by spraying the melts of said high-melting point oxides. Said procedures are adaptable for manufacturing microspheres of a diversified composition and structure, for example, those ranging in diameter from 10 to 500 mu. As to the bonding of said microspheres into a material, it is effected by sintering. Thus, the materials, comprising microspheres at a temperature of up to 2200° C with isothermal holding for 5 hours. Materials with microspheres of aluminum oxide are sintered at a temperature of up to 1950° C, their holding time being up to 10 hours.

We have found that said microspheres of the high-melting point oxides sintered directly with each other in a certain manner must exhibit not only a high recrystallization resistance and an improved deformability but a substantially higher strength as compared with the prior-art materials. The relationship between the strength of said material and its structural elements, established by the authors of the present invention, can be expressed as follows:

$$\tau_n = \tau_o \frac{K(1-P)^{5/3}}{\gamma \cdot n^2} \qquad (1),$$

when
- $\sigma_n$ is a tensile strength of a porous material sintered of microspheres;
- $\sigma_o$ is a tensile strength of a material in the microsphere contact zone (or a tensile strength of a compact material);
- $P$ is a volume porosity ratio (a free volume between microspheres);
- $\gamma$ is a stress concentration coefficient in the microsphere contact zone ($\gamma = 1 + 2\sqrt{n(n-1)}$);
- $n$ is a microsphere radius/microsphere contact radius ratio ($n = R/X$);
- $k$ is a coefficient determined by the number of contacts between said microspheres (with the number of contacts equal to 8, $k = 3$).

The established relationship discloses graphically the interdependence between the strength of a porous material and its structure. It should be noted that P (volume porosity ratio) and $n$ are the best controlled parameters, the $n$ parameter being the main in the theory of sintering. Sintering may proceed by various mechanisms. Generally, the kinetics of this process obeys the following relationship:

$$\left(\frac{x}{R}\right)^\alpha = AiR^{-\beta} \qquad (2)$$

where $\alpha = 2; \beta = 1$ in case of viscous flow;
$\alpha = 5; \beta = 3$ for volume diffusion;
$\alpha = 7; \beta = 4$ for surface diffusion;

Ai is a function of the surface energy, viscosity and diffusion coefficients. By substituting (2) in (1) and by making corresponding transformations the following relationship can be obtained $$\sigma_n = Bi\sigma_o R^{-m} \qquad (3),$$

where
Bi is a function including Ai;
R is a microsphere radius;
$m$ is a coefficient (in case of viscous flow $m = 1$; for volume diffusion $m = 6/5$; for surface diffusion $m = 8/7$ and for evaporation or condensation $m = 4/3$).

An experimental check of the above relationship has verified its validity and has determined the range of controlled parameters enabling an optimum solution of the task which constitutes the essence of the present invention, i.e. the selection of a volume ratio of the microspheres in the proposed material, their size and contact value between the sintered microspheres.

Hence, we have found that the microspheres of the high-melting point oxides must have a diameter of from 10 to 200 mu and should be sintered directly with each other so that their contact diameter would amount to 0.2–0.5 of the microsphere diameter. Moreover, the proposed material must comprise, as we have found, 50–75 volume percent of said sintered microspheres.

The proposed material being a porous one, 50–25 volume percent of said material are open air pores. According to particular embodiments, the open air pores can contain some filler, which will be discussed hereinbelow in detail.

The above prerequisites, if fulfilled, would permit achieving the object of the present invention: the provision of a heat-resistant porous structural material substantially superior to the known materials in this class in such characteristics as the strength, deformability and recrystallization resistance. Particularly, the strength and deformability of the proposed material increased from 5 to 10 times along with a 10–20 fold reduction in the recrystallization velocity. The materials, according to the invention, may find extensive application in high-temperature engineering, especially in thermally stressed elements of power and process apparatus operating in an oxidizing atmosphere at a temperature on their surface of up to 2000° C within $10^3$–$10^4$ hours. These elements include, e.g., electrodes and insulators of magnetohydrodynamic generators, gas turbine elements and process plant filters.

Thus, the herein-produced material made, e.g., of microspheres of stabilized zirconium dioxide, 30–40 mu in diameter, with the contact diameter of 0.3 of the microsphere diameter and a porosity of 30 volume percent exhibits a compression strength of 6000 kg/cm², a tensile strength of 500 kg/cm² and 0.01 elongation at room temperature, which means a 5–10-fold increase as compared with corresponding characteristics of the known granular material of a similar composition.

A material, comprising aluminum oxide microspheres, 30–40 mu in diameter with the contact intersphere diameter of 12–15 mu and a 35% porosity features a compression strength of 9000 kg/cm², a tensile strength of 950 kg/cm² and relative deformation of 0.007, which also surpasses the corresponding characteristics of the known porous materials by 7–10 times. The recrystallization velocity of the proposed material, which is expressed by the alteration of the grain (microsphere) geometry and size is considerably lower than that of conventional materials. Thus, in a material, comprising sintered aluminum oxide microspheres, 60–70 mu in diameter, no secondary recrystallization was revealed after isothermal holding for 50 hours at a temperature of 1860° C.

The materials, according to the invention, whose composition incorporates additionally 25–50 volume percent of a filler, can be employed for ablation thermal protection purposes, as heat-resistant lining, as an arc electrode. In this case use can be made of such speciality fillers as: metals, such as bismuth, copper, silver; metallic alloys, such as, iron-nickel or chromium-iron-nickel alloys, or intermetallic compounds, such as, an intermetallic compound based on silver and aluminum with an aluminum content of 7.69 atomic percent and a melting point of 779° C; an iron-nickel-based intermetallic compound with a nickel content of 75.9 atomic percent; an aluminum-nickel-based intermetallic compound comprising 57.97 atomic percent of aluminum.

Moreover, as a filler use may be made of organic compounds, such as, phenol-formaldehyde resins, polyvinyl alcohol or an organosilicone polymer, e.g., polyorganosiloxanes, siloxane thermosetting polymers, siliconalkyd polycondensates and glass.

Said fillers, when introduced into the composition of the proposed materials, have the following effect on their properties:

Thus, a heat-resistant structural material, comprising microspheres of zirconium dioxide stabilized by 6 weight percent of calcium oxide, 92–100 mu in diameter and with the contact diameter between the sintered microspheres of 30–40 mu and a 35% porosity shows a compression strength of 800 kg/cm².

A structural electrical engineering material of a similar composition and structure, comprising additionally 30 volume percent of bismuth features a compression strength of 2100 kg/cm² and is able to conduct an electric current with a density of up to 100 A/cm² at a voltage of up to 50 V when operating under arc discharge conditions.

A structural ablation material, comprising 60 volume percent of microspheres of zirconium dioxide stabilized by 15 weight percent of yttrium oxide, 150 mu in diameter with the contact diameter between the sintered microspheres of 40–45 mu, whose composition incorporates additionally 35 volume percent of an organosilicon polymer employed as a filler, is capable of operating without any changes in its geometry in contact with combustion product flow owing to evaporation of the polymer.

A structural heat-resistant thermostable material, comprising 66 volume percent of microspheres of zirconium dioxide stabilized by calcium oxide, 92–100 mu in diameter with the contact diameter between said microspheres of 34–38 mu, whose composition incorporates additionally 25–30 volume percent of glass with a thermal expansion coefficient of $1-3.10^{-6} deg^{-1}$, and shaped as a plate, 17 mm thick, is capable of withstanding without cracking one-sided heating at a rate of 2–2.5 deg/s which surpasses by 5–6 times the permissible heating rate of the plate that is similar is size but produced in the known granular material of a similar composition and a 18% porosity (said permissible rate varying from 0.2 to 0.3 deg/s).

The materials, according to the present invention, can be fabricated by using the known methods of ceramic technology dealing with nonplastic high-melting point oxides. Thus, separation of microspheres into fractions is effected with the help of standard sieves or separators. As to the moulding of said materials, it can be accomplished:

1. by vibration placement in ceramic moulds;
2. by slip casting with subsequent drying;
3. by semidry pressing also followed by drying.

A common final operation peculiar to all said methods is sintering, preferably in gas-fired open-flame furnaces at a temperature amounting to 0.8–0.9 of the melting point of corresponding oxides with isothermal holding for 2–10 hours. The materials, according to the present invention, whose composition incorporates additionally a filler, are manufactured by impregnating them with appropriate substances and compounds. The impregnation methods may include:

a. injection moulding;
b. centrifugal casting;
c. vacuum impregnation;
d. impregnation under the effect of capiliary forces.

EXAMPLE 1

A heat-resistant porous structural material, comprising microspheres of zirconium oxide stabilized by 6 weight percent of calcium oxide, 50–56 mu in diameter with the contact diameter between the sintered microspheres of 18–20 mu and a porosity of 34 volume percent shows a compression strength of 2000 kg/cm$^2$, a tensile strength of 250 kg/cm$^2$ and relative deformation of 0.008 at a temperature of 20° C.

The microspheres of which the material is composed were produced by plasma treating of powdered stabilized zirconium oxide.

The material fabrication process involves the following operations:

1. Separation of the microspheres in fractions with the help of a standard set of reciprocating sieves to obtain a fraction 50–56 mu in diameter.
2. Vibration moulding (vibration placement) of the microspheres in a ceramic container of stabilized zirconium oxide. Spontaneous sintering in oxygen-gas-fired furnace for 5 hours at a temperature of 2100° C.

Upon sintering the container was separated from the material by machining.

EXAMPLE 2

A material, as per Example 1, whose composition incorporated additionally 26 volume percent of a phenol-formaldehyde resin was produced by being impregnated with said resin in a vacuum chamber with subsequent polymerization of the resin. Owing to an ablation effect and with the destruction and entrainment of the resin the material of Example 2 ensured durability of a heat-insulating element without changing its geometry with the resin being entrained at a rate of $25.10^{-4}$ g/cm$^2$.s.

EXAMPLE 3

A material, as per Example 1, whose composition incorporated additionally 20 volume percent of polyvinyl alcohol was manufactured by being impregnated with said polyvinyl alcohol in a vacuum chamber. Owing to an ablation effect and with the destruction and entrainment of a resin the material of Example 3 provided durability of a heat-insulating element without any changes in its geometry with the alcohol being entrained at a rate of $5.10^{-3}$ g/cm$^2$.s.

EXAMPLE 4

A material, as per Example 1, whose composition incorporated additionally 30 volume percent of bismuth was manufactured by being subjected to forced impregnation with bismuth in a chamber under a pressure of 50 atm. and at a temperature of 1000° C. The material of Example 4 provided durability of an arc electrode at a current density of 80 A/cm$^2$ without any changes in its geometry for 60 s.

EXAMPLE 5

A heat-resistant porous structural material produced according to Example 1, comprising 66 volume percent of microspheres of zirconium dioxide stabilized by calcium oxide, 92–100 mu in diameter with the contact diameter of the microspheres varying from 34 to 38 mu, with the material composition incorporating additionally 25–30 volume percent of glass with a thermal expansion coefficient of $1-3.10^6 deg^{-1}$, is employed in the form of plates 17 mm thick, said plates withstanding without cracking one-sided heating at a rate of 2–2.5 deg/s, which surpasses by 5–6 times the permissible heating rate of a plate of a similar size but produced from the known granular material of a similar composition and a 18% porosity.

EXAMPLE 6

A heat-resistant porous structural material of Example 1 is impregnated in air at a temperature of 1020° C with an alloy, comprising silver and 1–2 weight percent of copper oxide. Impregnation is carried out under the effect of capiliary forces. The material shaped as a bar measuring 10×10×40 mm or as a disk 30 mm in diameter and 10 mm thick, containing 25–30 volume percent of said alloy is capable of withstanding without cracking one-sided heating in a gas flow up to a temperature of 2200° C followed by cooling to room temperature at a rate of 2000° deg/s. The material is capable of conducting an electric current having a density of up to 20 A/cm$^2$.

EXAMPLE 7

A heat-resistant structural ablation material, comprising 60 volume percent of microspheres of zirconium dioxide stabilized by 15 weight percent of yttrium oxide, 140–160 mu in diameter with the contact diameter of the sintered microspheres varying from 40 to 45 mu, said material containing as a filler 35 volume percent of an organosilicone polymer is capable of operating without any changes in its geometry when brought in contact with a flow of combustion products owing to destruction and evaporation of the polymer. Impregnation with said polymer was carried out in a vacuum chamber under a pressure of $1.10^{-1}$ mm Hg at a temperature of 100° C and was followed by polymerization.

EXAMPLE 8

A heat-resistant porous structural material, comprising 65 volume percent of microspheres of aluminum oxide, 30–40 mu in diameter with the contact diameter of the sintered microspheres being 12–15 nu shows a compression strength of 9000 kg/cm$^2$, a tensile strength of 950 kg/cm$^2$ and relative deformation of 0.007. The micropheres of which the material was composed were produced by plasma processing of powdered artificial corundum (electrolytically produced corundum). The material was moulded by vibration placement of the microspheres in corundium crucibles. Sintering was effected in an oxygen-fired furnace at a temperature of 1850° C, with isothermal holding for 5 hours.

EXAMPLE 9

A material, obtained in Example 8 and comprising 65 volume percent of microspheres of aluminum oxide, 60–70 mu in diameter, sintered directly with each other so that the diameter of contact of said microspheres amounts to 20–25 mu, is not subjected to secondary recrystallization during isothermal holding lasting 50 hours at a temperature of 1800° C.

EXAMPLE 10

A heat-resistant porous structural material, comprising 65 volume percent of microspheres of yttrium oxide, 30–40 mu in diameter with the contact diameter of said sintered microspheres being equal to 12–15 mu shows a compression strength of 1850 kg/cm$^2$, a tensile strength of 200 kg/cm$^2$ and relative deformation of 0.005. The microspheres of which said material was composed were produced by plasma processing of powdered yttrium oxide. Sintering was effected in crucibles of stabilized zirconium dioxide in an oxygen-gas-fired furnace at a temperature of 2100° C with isothermal holding for 7 hours.

What we claim is:

1. A heat-resistant porous structural material, comprising 50–75 volume percent of microspheres of high-melting point oxides with a melting point in excess of 1700° C, said microspheres being 10–200 mu in diameter and being sintered directly with each other so that the diameter of contact of said microspheres amounts to 0.2–0.5 of said microsphere diameter.

2. A heat-resistant porous structural material, of claim 1, whose composition incorporates additionally 25–50 volume percent of a filler.

3. A heat-resistant porous structural material of claim 2, comprising a filler selected from the group consisting of a metal, a metallic alloy and an intermetallic compound.

4. A heat-resistant porous structural material of claim 2, comprising a filler selected from the group consisting of a phenol-formaldehyde resin, polyvinyl alcohol, an epoxy resin and an organosilicone polymer.

5. A heat-resistant porous structural material of claim 2, comprising glass as a filler.

* * * * *